Figure 1:
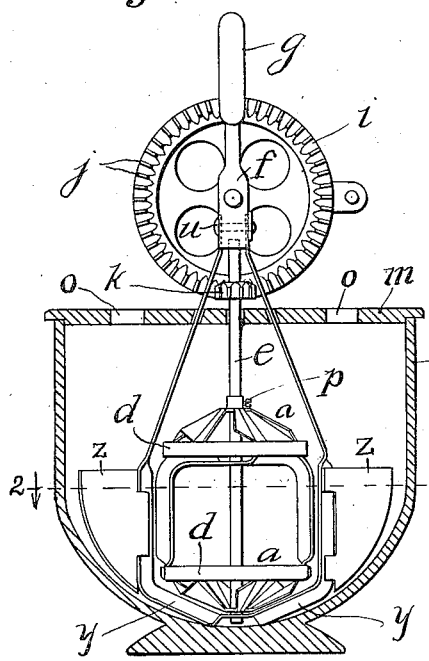

UNITED STATES PATENT OFFICE.

EVELYN P. SPERRY, OF OAK PARK, ILLINOIS.

BEATER FOR BEATING AND AERATING EGGS, CREAM, BATTER, AND OTHER MATERIALS.

1,036,159. Specification of Letters Patent. Patented Aug. 20, 1912.

Application filed August 16, 1909. Serial No. 513,112.

*To all whom it may concern:*

Be it known that I, EVELYN P. SPERRY, a citizen of the United States, residing in Oak Park, in the county of Cook and State of Illinois, have invented certain new and useful Improvements in Beaters for Beating and Aerating Eggs, Cream, Batter, and other Materials, of which the following is a specification.

This invention relates to that class of beaters which are adapted to be used for beating, mixing and aerating eggs, cream, batter, custards or other materials.

The principal object of the invention is to provide a simple, economical and efficient egg beater or beater for mixing, beating and aerating eggs, cream, batter or similar materials.

A further object of the invention is to provide a beater which is adapted to thoroughly beat, mix and aerate efficiently, and with substantially the highest possible degree of facility, comparatively small or large quantities of eggs, cream batter or other materials.

A further object is to provide a beater having one or more wheels mounted upon a suitable rotary support, shaft or spindle, each wheel having radial blades inclined so as to throw the material operated upon outward and upward, or having a bottom wheel adapted to throw outward and upward, and other wheels on the same support and rotating in preferably the same direction adapted to throw outward and either downward or upward as required, in combination with a bow or frame forming preferably stationary side baffles, outside of and adjacent to the peripheries of the wheel or wheels and adapted to divert the current of the material thrown outward by the wheels inward and into position to be repeatedly operated upon by the wheel or wheels as it passes between the peripheral edges of the latter and the inner edges of the side baffle or baffles, said bow also forming a support for the bottom of the spindle or wheel support, and forming bottom baffles adapted to divert the material upward from the bottom of the vessel into or between the blades of the wheel or wheels. The outward movement of the material operated upon is limited by the preferably annular walls of the vessel in which the beater mechanism is mounted. Either a comparatively large or a comparatively small quantity of material may thus be operated upon and thoroughly aerated and intermixed by means of wheels much smaller than would be required in the absence of such baffles, and wheels of a given size are thus enabled to operate efficiently and with the greatest possible degree of facility upon either a comparatively large or a comparatively small quantity of material, and in either a large or comparatively small vessel. By providing, in combination with the above elements, one or more removable side baffles or wings the wheels may be of a size adapted to operate in an efficient manner upon the smallest desired quantity of material, or in the smallest desired size of vessel without the removable baffles or wings, and the baffles will enable the machine with such relatively small wheels to operate in an efficient manner upon a comparatively great quantity of material and in a comparatively large vessel when required, the facility of operation and the capacity of the machine with wheels of a given size being greatly increased by both the permanent and the removable baffles.

The invention consists in the features, combinations, and details of construction herein described and claimed, and illustrated in the accompanying drawings which are made a part of this specification.

Figure 3:
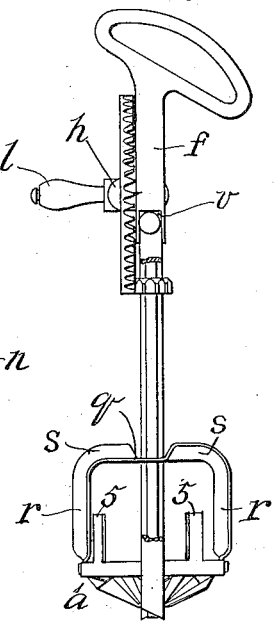
Figure 5:
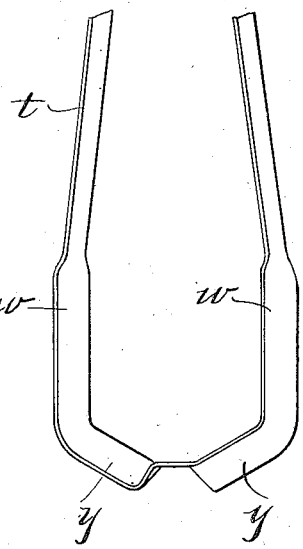
Figure 2:
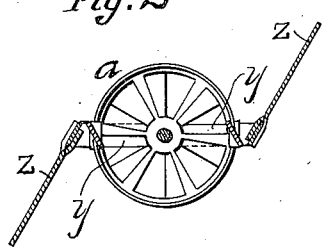
Figure 4:
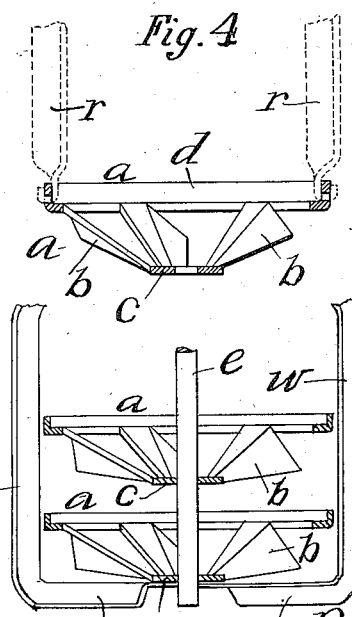
Figure 7:
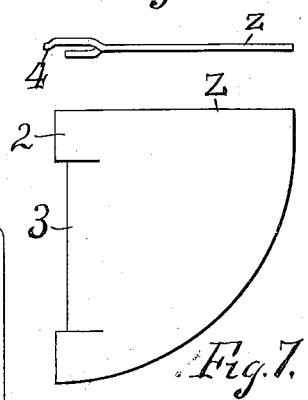
Figure 8:
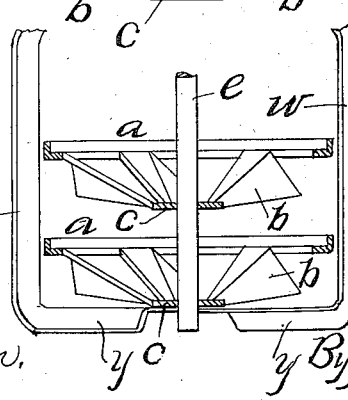

In the accompanying drawings Figure 1 is a view in elevation of a beater constructed in accordance with my improvements; Fig. 2, a sectional plan view, taken on line 2 of Fig. 1, looking in the direction of the arrow; Fig. 3 a side elevation, with the removable baffles or wings shown in Figs. 1 and 2, removed; Fig. 4 an enlarged detail view in section of the wheel shown in Fig. 2; Fig. 5, a detail view in elevation showing the bow or baffles in perspective; Fig. 6, a top view of a removable baffle or wing, and Fig. 7, a detail view in side elevation of the removable baffle or wing shown in Fig. 6, and Fig. 8 a detail view in sectional elevation showing two wheels on the same spindle, both adapted to throw upward and outward.

In constructing a beater in accordance with my improvements I provide one or more wheels *a* each having a series of radial wings *b* all formed preferably of one integral piece of sheet metal, and having the hub *c* in a different plane from the rim *d* which connects the outer tips or corners of the blades or wings *b*. A plurality of these wheels may be mounted on the same support or spindle *e*. When only one wheel is used I prefer to have the radial blades so inclined as to throw upward and outward, or in other words each blade is inclined upwardly and rearwardly from its forward edge so as to throw outward and upward. The top wheel, however, may be inverted so that its blades are inclined downward and rearward from their forward edges respectively.

The top end of the spindle is journaled in a supporting frame member *f* having a handle *g* by which the device may be held in one hand while the other hand of the operator is employed in turning the crank or gear wheel by means of which the beater wheels or stirring and aerating mechanism is rotated.

Mounted upon the frame member *f* by means of a stud or stub shaft *h* is a gear wheel *i*, the teeth *j* of which mesh with and are adapted to operate the teeth of the pinion *k* on the spindle *e*.

A crank handle *l'* upon the gear wheel serves as a means for rotating the latter and thereby the stirring wheels or beater mechanism. A cover *m* for the vessel *n* may be secured to the stationary portion of the frame of the beater or form a part thereof, when required. The cover should be provided with perforations *o* for admitting air by which the material to be operated upon may be aerated.

The stirrer or beater wheels may be adjusted to any desired position up or down on the spindle or to different distances from each other by providing one or more of said wheels with a set screw or cotter *p*. A bow *q* having upwardly and downwardly extending side blade portions *r* may be secured to and rotate with the spindle, or may be secured to and form a part of one of the beater wheels, or to both the spindle and wheel as shown in Figs. 1 and 2. The side blade portions of this bow extend inward and rearward from their outer edges with respect to the direction of rotation, so as to throw the material inward from the inner edges of the side baffles hereinafter described, and the upper portion of the bow forms inclined transverse blades *s* the bottom surfaces of which are inclined downward and rearward from their forward edges and with respect to the direction of rotation.

A frame member or bow *t* secured to the frame member *f* by means of a rivet *u*, and having its upper end portions set into sockets or counter-sunk portions *v*, is so arranged that its side portions *w* form baffles outside of and adjacent to the peripheries of the beater wheels. The inner faces of these side baffles extend inward and forward with respect to the direction of movement or rotation of the adjacent peripheries of the beater wheels so as to divert the current of material operated upon inward from the side wall of the vessel toward, into and between the beater wheels and the blades of the latter. The bottom portion of the bow or frame member *t* forms bottom baffles *y*, the upper sides or surfaces of which extend upward and forward at an incline with respect to the direction of movement of the adjacent portions of the beater wheel which is directly over said bottom baffles. The blades of the bottom wheel and the bottom baffles thus both tend to throw the material to be operated upon upward from the bottom of the vessel and through and between the blades of the beater or stirrer wheels. The wheels also throw the material outward by centrifugal force toward the side walls of the vessel and into contact with the side baffles. The material thus coming into contact with the side baffles is diverted back into the wheels to be again thrown out back of each side baffle repeatedly or successively, and is thus thoroughly intermixed, beaten and aerated.

Removable wings or side baffles *z* made to conform somewhat to the size, form and dimensions of the vessel in which the device is to be used or forming a part of the device, are removably mounted on the side baffles, to which they are removably secured in any ordinary and well known manner, preferably by means of clips or tongues 2 and 3 adapted to engage opposite sides of the permanent baffles and hold the removable baffles, wings or blades in operative position.

The tongues 2 are bent inward so as to form shoulders or hook portions 4 adapted to engage the permanent baffles and increase the security of the connection between the parts. The tongues or clips 2 and 3, are flexible, and the wings *z* are also preferably flexible, and adapted to be bent to the desired incline, and to the desired extent for the purpose of conforming to the different sized vessels in which the device is to be used from time to time. The removable wings are preferably so arranged that they extend inward and forward at an incline from their outer edges with respect to the direction of movement of the adjacent peripheries of the beater wheels and the direction of movement of the current of material to be operated upon.

It will be noted that the permanent baffles increase the capacity of the device having beater wheels of a given size, and that the capacity is still further increased by the use of the removable baffles or wings, and that wheels adapted to operate in an efficient manner upon a comparatively small quantity or the smallest desired quantity of material are enabled to beat, stir, and aerate in an efficient manner a much larger quantity of material than would be practicable with wheels of the same size without the baffles.

I claim:—

1. In a device of the class described, the combination of a rotary beater wheel, a rotary spindle upon which the wheel is mounted, a frame member forming a support for the lower end of the spindle and having an upwardly extending portion outside of and adjacent to the periphery of the wheel and forming a side baffle adapted to divert material inward toward the periphery of the wheel, a baffle portion on the frame located below the wheel and having an upper surface inclined upwardly and in the direction of rotation of the wheel and adapted to divert material upward toward the wheel and means for operating the wheel.

2. In a device of the class described, the combination of a beater wheel, a rotary spindle upon which the wheel is mounted, a frame forming a support for the lower end of the spindle and having upwardly extending portions on opposite sides of the periphery of the wheel forming side baffles outside of and adjacent to the wheel, said frame having a baffle portion comprising an upper surface inclined upwardly and in the direction of rotation of the wheel and located below the latter, for diverting material upward toward the wheel, and gear mechanism connected with the spindle for rotating it and thereby the wheel.

3. In a device of the class described, the combination of a beater wheel, a rotary spindle upon which the wheel is mounted, a frame member forming a support for the lower end of the spindle and provided with an inclined portion below the wheel having an upper surface extending at an incline upward and in the direction of rotation of the wheel, forming a baffle adapted to divert material upward toward the wheel, means for supporting the upper end of the spindle, and means for rotating the spindle and thereby the wheel.

4. In a device of the class described, the combination of a beater wheel, a spindle upon which the wheel is mounted, a frame member forming a support for the lower end of the spindle and having oppositely inclined portions below the wheel forming baffles adapted to divert material upward toward the wheel, said frame member having upwardly extending side baffles outside of and extending above and below the periphery of the wheel, and means for rotating the wheel.

5. In a device of the class described, the combination of a beater wheel provided with radial blades each having a side portion extending upward and rearward from its front edge and at an incline with respect to the direction of movement of said blades, a stationary frame member forming a stationary baffle the inner side of which extends inward and forward with respect to the adjacent periphery of the wheel and at an oblique angle with respect to the direction of movement of such adjacent peripheral portion of the wheel, and gear mechanism for rotating the wheel.

EVELYN P. SPERRY.

Witnesses:
HARRY IRWIN CROMER,
CARRIE E. JORDAN.